United States Patent [19]

Wagener

[11] Patent Number: 4,457,481
[45] Date of Patent: Jul. 3, 1984

[54] HOLDER FOR LIGHT TRACKS

[75] Inventor: Hans Wagener, Dietzholztal, Fed. Rep. of Germany

[73] Assignee: Rittal-Werk Rudolf Loh GmbH & Co. KG, Fed. Rep. of Germany

[21] Appl. No.: 411,706

[22] Filed: Aug. 26, 1982

[30] Foreign Application Priority Data

Nov. 3, 1981 [DE] Fed. Rep. of Germany ....... 3143518

[51] Int. Cl.³ .............................................. F21L 21/08
[52] U.S. Cl. .................................................. 248/68.1
[58] Field of Search ................ 248/68 R, 68 CB, 251, 248/317; 362/404; 52/28, 39

[56] References Cited

U.S. PATENT DOCUMENTS

| 2,348,096 | 5/1944 | Schack | 248/68 CB |
| 2,356,318 | 8/1944 | Hayman | 248/68 CB |
| 3,027,419 | 3/1962 | Owen | 248/68 CB |
| 3,186,051 | 6/1965 | Waddell | 248/68 CB |
| 3,894,706 | 7/1975 | Mizusawa | 248/68 CB |
| 3,910,537 | 10/1975 | Laboue | 248/68 CB |
| 3,936,023 | 2/1976 | Clifton | 52/28 |
| 4,109,305 | 8/1978 | Claussen | 362/220 |
| 4,118,760 | 10/1978 | Cohon | 362/270 |
| 4,347,998 | 9/1982 | Loree | 248/68 R |

FOREIGN PATENT DOCUMENTS

| 7521773 | 10/1975 | Fed. Rep. of Germany .... 248/68 R |
| 7709147 | 7/1977 | Fed. Rep. of Germany .... 248/68 R |
| 335221 | 9/1930 | United Kingdom ........... 248/68 CB |
| 1028026 | 5/1966 | United Kingdom ............. 248/68 R |
| 2005758 | 4/1979 | United Kingdom ............. 248/68 R |

Primary Examiner—Reinaldo P. Machado
Assistant Examiner—Alvin Chin-Shue
Attorney, Agent, or Firm—Thomas W. Speckman

[57] ABSTRACT

A holder for light tracks comprising an elongate generally squared carrier member having a plurality of channel-shaped recesses in its upper surface for receiving light tracks, and means for securing the light tracks installed in the channels. To mount light tracks of different widths and thicknesses in a holder according to the invention, plug-in members are inserted and fixedly retained in the channels in the carrier member of the holder by means of a common cover member.

14 Claims, 13 Drawing Figures

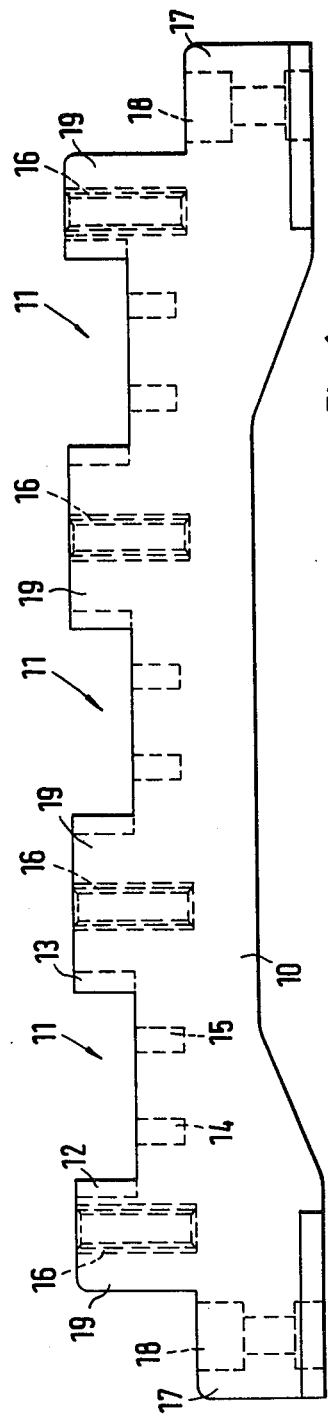
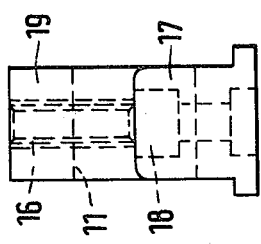
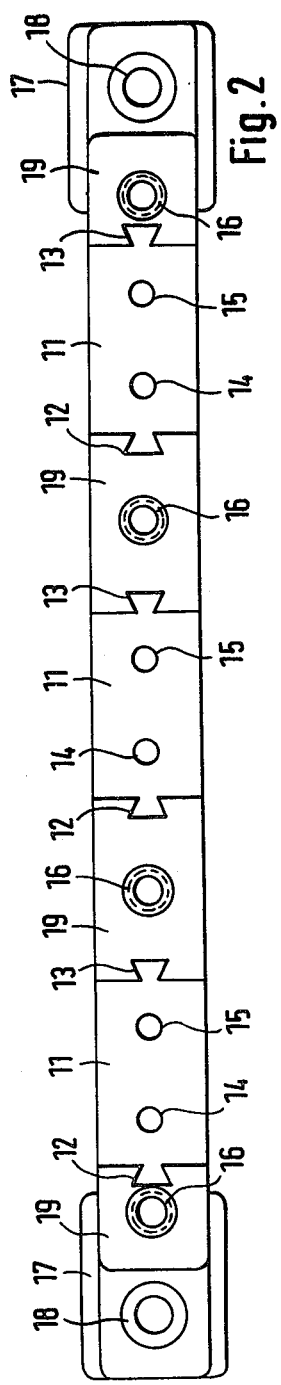

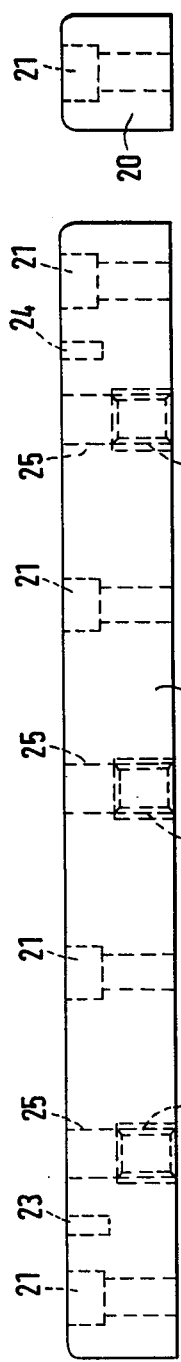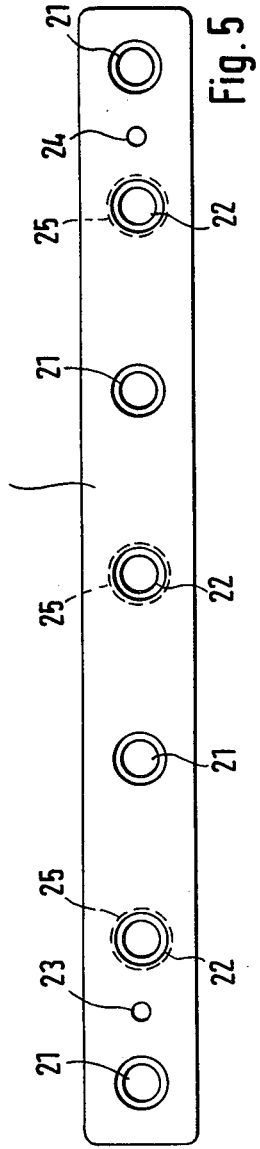

HOLDER FOR LIGHT TRACKS

BACKGROUND OF THE INVENTION

1. Field of the Invention

This invention relates to a holder for light tracks, made up of an elongate generally squared carrier member having a number of channel-shaped recessed areas in its upper surface for receiving light tracks therein, and means for securing the light tracks in the channels.

2. Description of the Prior Art

A holder of an elongate generally squared carrier member is disclosed by Federal Republic of Germany Utility Model No. DE GM 75 21 773. The channels in the plastic carrier member have different depths to accommodate different widths of track. The side walls of the channels are notched for receiving a slide to secure the track inserted in the channels. These slides for securing the light tracks in the channels have flexible braces and are molded in one piece with the carrier member. The side walls of the channels in the carrier member are provided with several pairs of oppositely disposed notches, so that light tracks of different thicknesses but same width may be installed in one channel.

It is also known from Federal Republic of Germany Utility Model No. DE GM 77 09 147 to install individual or packeted light tracks in a channel of the carrier member. In order for the upper surfaces of the light tracks to lie in a common plane, spacers of different size are employed to fill out the depth of the channels. The channels are all of the same depth so as to accept the maximum quantity of packeted light tracks.

These familiar light track holders or mounts are suitable for the installation of light tracks having the same width but different thicknesses. Their use is thus limited to a fairly narrow group of light tracks. However, it will be noted that light tracks come not only in different thicknesses of 3 mm, 4 mm, 5 mm, 8 mm, and 10 mm, for example, but also in different widths of 16 mm, 20 mm, 25 mm and 30 mm, for example.

SUMMARY OF THE INVENTION

It is the object of the present invention to provide holders, or mounts, for track lighting by which track of various thicknesses and widths may be installed.

This is accomplished according to the invention in that the width of the recessed or cutout channels in the carrier member is greater than, and the depth of such channels is greater than or equal to, the maximum cross-sectional dimensions of the light tracks installed, that the channels in the carrier member are adapted to receive and fixedly retain plug-in members matching the dimensions of the channels and their upper surfaces being provided with receptacles accommodating the cross-sectional configuration of the particular track used, that in addition to channels screw threaded sockets are inserted in the upper surface of the carrier member, that the carrier member is covered by and connected to an elongate generally squared cover member provided with screw threaded sockets for receiving tightening screws, and which is further adapted to accept tightening screws by way of threaded sockets in the carrier member having holes with specially dimensioned sections for accepting the heads of the tightening screws and by way of the channels in the carrier member and hence the receptacles of the plug-in members.

This particular construction of the channels in the carrier member and the insertion of simple plug-in means which are designed to fit into the channels and are receptive of a particular track size, permits a universal usage of the novel two-piece holder. Due to the screw threaded sockets, not only is the connection between the carrier member and cover member facilitated, but also the retention of the light track in the receptacles of the plug-in member is made easy.

The retentive fit between the carrier member and the plug-in member is achieved according to one embodiment of the invention in that the plug-in fitting and the walls of the channels in the carrier member, which are perpendicular to the bottom and fastening area of the carrier member, are provided with complementary dovetail elements. Preferably, the mortises are in the walls of the channels in the carrier member while the tenons are on the walls of the plug-in members.

The retention of the plug-in member in the channels of the carrier member may further be enhanced according to another embodiment, in that the bottom of the channels in the carrier member has blind holes for accepting pegs provided on the underside of the plug-in member facing the channel bottom in the carrier.

The installation of a holder in a switch or service panel is achieved according to another embodiment in that each end of the member takes the form of an attachment block having an offset fastening hole therein.

The screw threaded sockets provided in the carrier member are inserted from the top into blind holes in the carrier member and are flush with the upper surface of the carrier member.

The screw threaded sockets provided in the cover member, however, are inserted into through holes in the cover member and extend from the underside facing the carrier member only partway into the through hole and are flush with the underside of the cover member.

In order for the cover member to be joined to the carrier member by means of screw connections, one embodiment provides for an enlarged section in the holes in the cover member to accept the head of a connecting screw.

An equal spacing of the channels in the carrier member results in a corresponding spacing of the light tracks in the holder, provided that the plug-in members are symmetric about a center axis extending perpendicularly to the longitudinal axis of the carrier member.

If the spacing of the channnles in the carrier member is intended to be different from the spacing of the light tracks, another embodiment provides for the receptacle to be displaced with respect to the center axis of the plug-in member.

If the entire depth of the channel in the carrier member is to be used for installing a light track, one embodiment of the invention has been found advantageous in which the plug-in member is formed of two separate, preferably identical composite elements. The composite elements then serve to compensate for the different widths of the light tracks.

BRIEF DESCRIPTION OF THE DRAWING

The invention will be further described with reference to representative embodiments illustrated in the drawing, in which:

FIG. 1 is a side view of the carrier member of the holder;

FIG. 2 is a top plan view of the carrier member of FIG. 1;

FIG. 3 is a front view of the carrier member of FIG. 1;

FIG. 4 is a side view of the cover member;

FIG. 5 is a top plan view of the cover member of FIG. 4;

FIG. 6 is a front view of the cover member of FIG. 4;

FIG. 7 is a side view of a first plug-in member;

FIG. 8 is a top plan view of the plug-in member of FIG. 7;

FIG. 9 is a side view of a second plug-in member;

FIG. 10 is a top plan view of the plug-in member of FIG. 9;

FIG. 11 is a side view of a plug-in member consisting of two composite plug-in elements;

FIG. 12 is a top plan view of the composite plug-in elements of FIG. 11; and

DESCRIPTION OF PREFERRED EMBODIMENTS

Figure 13:
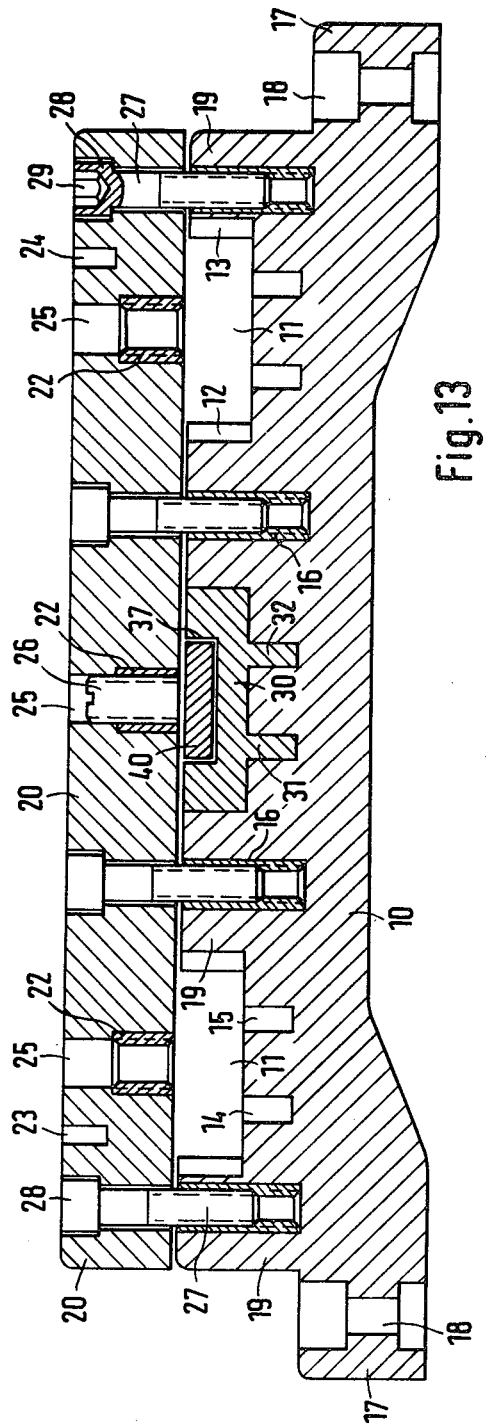
FIG. 13 is a sectional view of the holder assembly comprising a carrier member, a cover member and plug-in members.

The holder for light tracks according to the invention comprises carrier member 10 as shown in FIGS. 1 to 3, cover member 20 as shown in FIGS. 4 to 6, and various fittings or plug-in members as shown in FIGS. 7 to 12, for example.

Carrier member 10 is preferably made of a plastic material and is elongate and generally squared in configuration. Each of the two ends of carrier member 10 take the form of attachment blocks 17 having inset mounting holes 18. Since these mounting holes 18 have enlarged sections at both the bottom and the top, carrier member 10 can be secured from its underside as well as from its upper surface.

The upper surface of carrier member 10 is provided with three recessed sections or cutouts 11 in the case where three light tracks are used for a triple system. The number of cutouts 11 and hence the length of carrier member 10 depends on the number of light tracks to be installed. The width of recesses or cutouts 11 is greater than the maximum width of the light tracks. The depth of cutouts 11 may be equal to or greater than the maximum thickness of the light tracks. Inserted from above into elevated portions 19 adjacent recessed portions 11 are screw threaded sockets 16, placed about midway between the two ends of each portion 19, as it is shown in FIG. 2. Screw threaded sockets 16 are so inserted into blind holes in portions 19 that they are flush with the upper surface of carrier member 10. Screw threaded sockets 16 may also be integrally molded with the carrier member in the injection molding manufacturing process of carrier member 10. The side walls of the recesses 11 are provided with dovetail elements 12 and 13 which are the mortise portions of the dovetails in the illustrated embodiment. Drilled into the bottom of recess 11 are two blind holes 14 and 15. As it is clearly shown in FIG. 2, recessed portions 11 are symmetrical about a center axis which is perpendicular to the longitudinal axis of carrier 10.

Cover member 20 according to FIGS. 4 to 6 is likewise of an elongated generally squared configuration and is provided with holes for receiving connecting screws 27 in alignment with screw threaded sockets 16 in carrier 10. The enlarged portion of bore 21 for receiving head 28 of connecting screw 27 is at the upper side of cover member 20, as it is shown in the sectional view of FIG. 3. This enables cover member 20 to be firmly joined to carrier member 10. Connecting screws 27 are screwed into threaded sockets 16 in carrier member 10 at each side of recesses 11. Drilled into cover member 20 in alignment with the center axis of recesses 11 in carrier member 10 are through holes 25 for receiving from the underside, facing carrier 10, screw threaded sockets 22 which extend only partway into holes 25 and are flush with the underside of cover member 20. As is shown in FIG. 13, screw threaded sockets 22 are receptive of tightening screws 26 by which a light track is secured that has been placed in a receptacle 37 of a plug-in member or adapter 30. Into the upper surface of cover member 20 are drilled blind holes 23 and 24 accepting pegs of signs, nameplates or the like, or a cover plate.

Light tracks installed between at least two holders in a manner that they cannot be axially displaced, may be covered by the cover plate in a manner to prevent the light tracks from being freely accessible.

The uniformly sized and shaped recesses or cutouts 11 in carrier member 10 are adapted to receive plug-in members or adapters 30, the side walls of which are provided with dovetail elements 34 and 36. In the illustrated embodiment, these elements 34 and 36 take the form of the tenon or male portions to mate with the elements 12 and 13 in the cutout 11 in the form of the mortise or female portions. In addition, the underside of plug-in member 30 is provided with two pegs 31 and 32, which due to their dimensions and arrangement fit into blind holes 14 and 15 in the bottom of recesses 11, as shown in FIGS. 7 to 10. The upper surface of plug-in element 30 is provided with a receptacle 37 or 37' dimensioned to accept a particular size of track. For example, the receptacle 37 in the plug-in member 30 according to FIGS. 7 and 8 is 30 mm wide and 5 mm deep to accommodate a correspondingly dimensioned light track. Receptacle 37' in plug-in member 30 of FIGS. 9 and 10, however, is narrower and deeper and its size of 16 mm × 8 mm is suitable to accept a light track of different size. It will be noted that the mid axis of receptacle 37' is not aligned with the mid axis of the plug-in member 30. The spacing of the light track sections may therefore differ from the spacing of recesses 11 in carrier member 10.

It will be appreciated that the holder according to the invention is suitable to hold a variety of differently dimensioned light tracks, and that merely different types of plug-in adapters 30 are required to accomplish the required adjustment, bearing in mind that recesses 11 in carrier 10 have a width which is greater than the maximum width of the light tracks plus the elements 33 and 35 in plug-in adapter 30 by which receptacles 37 and 37', respectively, are defined.

The depth of cutouts 11 in carrier member 10 may be equal to, or greater than, the maximum thickness of the light tracks. If the thickness of the light track is equal to the depth of cutout 11 in carrier member 10, two identical composite plug-in elements 30.1 and 30.2 are used, as it is shown in FIGS. 11 and 12, which are inserted solely with dovetail elements 34 and 36 into cutout 11 to compensate for the width of the light track in order for cutout 11 in carrier 10 to be completely filled.

The sectional view of FIG. 13 illustrates the holder with a light track therein which is secured in center cutout 11 of carrier member 10 by means of tightening screws 26. Cover member 20 is joined to carrier 10 by four connecting screws 27. Plug-in member 30 receives in the receptacle 37 light track 40 and completely fills cutout or recess 11. Heads 28 of connecting bolts 27 have 6-point openings for a hex key wrench. After light tracks 40 have been installed in two or more holders of the foregoing type, light tracks 40 may be marked by signs, plates or the like, the attachment of which is facilitated by blind holes 23 and 24 in the upper surface of cover member 20.

Receptacles 37 and 37' in plug-in members 30, 30.1 and 30.2 may be adapted to accept track standing on edge or lying flat. This depends merely on the desired arrangement of the track lights. It is also possible to provide several receptacles 37 and 37' side-by-side on a plug-in member 30 so as to install several light tracks 40 in one plug-in adapter 30. In such arrangement, each light tracks 40 will be associated with a tightening screw 26 in cover member 20. When the location of track 40 is outside of and parallel to the holder, one tightening screw 26 will be sufficient for one light track 40.

I claim:

1. Holder for light tracks, of an elongate generally squared carrier member having a plurality of channel-shaped recessed areas in its upper surface for receiving light tracks therein, and means for securing said light tracks in said channels, characterized in the width of said recessed channels (11) in said carrier member (10) is greater than, and the depth of said channels (11) is greater than or equal to, the maximum cross-sectional dimensions of said light tracks (40), that said channels (11) in said carrier member (10) are adapted to receive and fixedly retain plug-in members (30, 30.1, 30.2) matching the dimensions of said channels (11) and their upper surfaces being provided with receptacles (37, 37') to accommodate the cross-sectional configuration of said track (40), that in addition to said channels (11) screw threaded sockets (16) are inserted in the upper surface of said carrier member (10), that said carrier member (10) is covered by and connected to an elongate generally squared cover member (20) provided with screw threaded sockets (22) for receiving tightening screws (26) and which is adapted to accept tightening screws (27) engaging threaded sockets (16) in said carrier member (10) and having holes (21) with specially dimensioned sections for accepting heads (28) of said screws (27) and covering said channels (11) in said carrier member (10) and hence said receptacles (37, 37') of said plug-in members (30, 30.1, 30.2).

2. Holder according to claim 1, characterized in that said plug-in members (30, 30') and the walls of said channels (11) in said carrier member (10), which are perpendicular to the bottom of said carrier member (10), are provided with complementary dovetail elements (12, 13, 34, 36).

3. Holder according to claim 1, characterized in that the bottom of said channels (11) in said carrier member (10) has blind holes (14, 15) for accepting pegs (31, 32) provided at the underside of said plug-in member (30) facing said channel bottom in said carrier (10).

4. Holder according to claim 1, characterized in that each end of said carrier member (10) has a mounting block (17) having an offset mounting hole (18) therein.

5. Holder according to claim 1, characterized in that said screw threaded sockets (16) of said carrier member (10) are so inserted into blind holes drilled into said carrier member (10) from the upper surface that they are flush with upper surface of said carrier member (10).

6. Holder according to claim 1, characterized in that said screw threaded sockets (22) provided in said cover member (20) are inserted into through holes (25) in said cover member and extend from the underside facing said carrier member (10) only partway into the through hole (25) and are flush with the underside of said cover member (20).

7. Holder according to claim 1, characterized in that said holes (21) in said cover member (20) are provided with an enlarged section at the upper surface of said cover member (20) to accept head (28) of said connecting screw (27).

8. Holder according to claim 1, characterized in that said plug-in members (30) are symmetric about a center axis extending parallel to said channels.

9. Holder according to claim 1 characterized in that said plug-in members (30) are non-symmetric about a center axis extending parallel to said channels (11).

10. Holder according to claim 1, characterized in that said plug-in member (30) is formed of two separate, composite elements (30.1, 30.2).

11. Holder according to claim 10, characterized in that said separate elements (30.1, 30.2) are identical.

12. Holder according to claim 2, characterized in that said dovetail elements (12, 13) in the walls of said channels (11) in said carrier member (10) take the form of mortises, and said dovetail elements (34, 36) on the side walls of said plug-in members (30, 30.1, 30.2) take the form of tenons.

13. Holder according to claim 1, characterized in that the upper surface of said cover member (20) is provided with additional blind holes (23, 24).

14. Holder according to claim 1, characterized in that said receptacles (37, 37') of said plug-in members (30, 30.1, 30.2) are designed to receive said light tracks (40) standing on edge or lying flat.

* * * * *